US007743541B2

(12) United States Patent
Suciu et al.

(10) Patent No.: US 7,743,541 B2
(45) Date of Patent: Jun. 29, 2010

(54) SIGN HOLDING EXTRUSION ARRANGEMENT

(75) Inventors: Rebecca C. Suciu, Lynn, MA (US); David E. Pitcher, Cambridge, MA (US); Thomas P. Burrous, Haverhill, MA (US); Alan L. Stenfors, Scituate, MA (US); Sidney Rose, Marblehead, MA (US)

(73) Assignee: Rose Displays Ltd, Salem, MA (US)

( * ) Notice: Subject to any disclaimer, the term of this patent is extended or adjusted under 35 U.S.C. 154(b) by 0 days.

(21) Appl. No.: 11/799,001

(22) Filed: Apr. 30, 2007

(65) Prior Publication Data

US 2008/0202007 A1 Aug. 28, 2008

Related U.S. Application Data

(63) Continuation-in-part of application No. 11/710,782, filed on Feb. 26, 2007.

(51) Int. Cl.

| | |
|---|---|
| ***G09F 3/20*** | (2006.01) |
| ***G09F 7/22*** | (2006.01) |
| ***G09F 7/00*** | (2006.01) |
| ***G09F 3/18*** | (2006.01) |
| ***G09F 7/18*** | (2006.01) |
| ***A47G 1/06*** | (2006.01) |
| ***A47G 1/10*** | (2006.01) |
| ***A47G 1/16*** | (2006.01) |
| ***G02B 27/02*** | (2006.01) |
| ***A47H 1/14*** | (2006.01) |

(52) U.S. Cl. ............................ 40/658; 40/617; 40/605; 40/361; 40/710; 40/649; 248/451; 248/316.7; 248/316.1; 248/229.1; 248/489

(58) Field of Classification Search .................. 40/658, 40/617, 605, 361, 710, 649; 248/451, 316.7, 248/316.1, 229.1, 489

See application file for complete search history.

(56) References Cited

U.S. PATENT DOCUMENTS

| | | | | |
|---|---|---|---|---|
| 5,090,145 | A * | 2/1992 | Chiang et al. | 40/605 |
| 5,381,991 | A * | 1/1995 | Stocker | 248/206.5 |
| 6,668,473 | B2 * | 12/2003 | Schoening | 40/518 |
| 6,708,939 | B2 * | 3/2004 | Walker | 248/323 |

* cited by examiner

*Primary Examiner*—Lesley Morris
*Assistant Examiner*—Syed A Islam
(74) *Attorney, Agent, or Firm*—Don Halgren

(57) ABSTRACT

An elongated sign holding extrusion for supporting a sign from an overhead member, comprising an elongated unitarily extruded frame assembly having an upper edge and a lower edge, with a first side portion and a second side portion extending therebetween. An elongated upper receiving-channel is arranged at the upper edge of the frame assembly. An hollow elongated, upper channel is arranged in a spaced-apart, adjacent and parallel manner to the elongated upper receiving channel in said frame assembly. An elongated middle channel contains a pair of elongated biasing members therein for pinchably supporting a poster therebetween. An elongated central channel is spaced adjacent the lower edge of the frame assembly for capture of slidable sign supporting hangers.

25 Claims, 7 Drawing Sheets

SIGN HOLDING EXTRUSION ARRANGEMENT

This invention is a continuation-in-part application of our co-pending patent application Ser. No. 11/710,782 filed Feb. 26, 2007 and incorporated herein by reference in its entirety.

BACKGROUND OF THE INVENTION

1. Field of the Invention

This invention relates to an elongated sign holding extrusion to be utilized with magnets for attachment to overhead ceiling supports such as inverted "T" shaped rails which are utilized in a commercial establishment.

2. Prior Art

Safely and conveniently supporting signs in a commercial establishment such as a retail store is an ongoing process. It is typically done by unsophisticated personnel working in areas which are not necessarily easily accessible. Such sign holders therefore need to be adaptably attachable to a ceiling support, such as for example an inverted "T" rail and likewise hold a sign in a safe and simple manner.

It is an object of the present invention to overcome the disadvantages of the prior art.

It is a further object of the present invention, to provide a sign supporting extrusion which is adaptable to a variety of overhead supports and/or T-rail configurations.

It is still yet a further object of the present invention, to provide a sign holding extrusion which permits signs to be readily changed and which signs may be supported from that extrusion in several different sign gripping manners.

BRIEF SUMMARY OF THE INVENTION

The present invention relates to an elongated sign supporting extrusion supportable from an inverted "T"-rail which is part of a ceiling tile support arrangement. The elongated sign holding extrusion is supportable to the inverted T-rail by arrangement of magnets disposed therebetween.

The elongated sign holding extrusion comprises an elongated frame assembly having a first or upper edge defined by a first upper "L"-shaped flange and a spaced apart, parallel, second upper "L"-shaped flange which between them define an elongated gap through which a magnet arrangement may be slidably disposed. The first upper L-shaped flange and the second upper L-shaped flange are connected to one another by an upper bridge portion arranged transversely therebetween.

A middle bridge member connects a first side portion and a second side portion of the frame assembly. An elongated upper chamber or channel is disposed between the middle bridge member and the elongated upper bridge member. The middle bridge member is of generally inverted "U"-shape in cross-section, defining a poster guide channel therewithin.

The side portions of the frame assembly each extend down to a lower or second elongated edge which is defined by a first lower "J"-shaped flange and a lower second "J"-shaped flange, which between them define an elongated receiving-gap. The side portions of the frame assembly each have a middle "J"-shaped flange extending inwardly therefrom to define an elongated middle chamber therebetween. Each middle J-shaped flange has a distal foot portion and an elongated inclined surface leg portion unitarily attached to the respective side portions of the frame assembly.

A first and a second elongated, free rolling, gripping member is disposed in the elongated middle chamber in abuttable contact with one another and in abuttable contact with the inclined tapered surfaces of the legs of the middle J-shaped flanges.

A lower elongated central channel or chamber is defined by the lower first and lower second J-shaped flanges with their inclined legs and distal feet extending generally towards one another at the lowermost edge thereof. The distal tips of each of the feet of the lower J-shaped flanges have the elongated gap therebetween, to permit entry of a sign or signs, or an elongated connector rod or other suspended sign connection means for attachment itself, to a sign disposed therebeneath.

A planar sign or a pair of planar signs, may be inserted between the lower elongated gap between the lower first and the lower second J-shaped flanges and also between the gap situated between the middle J-shaped flanges and into the middle chamber between the elongated floating gripping members. The sign or signs inserted therein would have an upper edge which would be in abutting contact with the inverted U-shaped guide channel of the middle bridge member.

The first and second elongated floating gripping members are affected by gravity, and are caused to pinch any sign or signs spaced therebetween. The inclined or tapered surfaces of the respective leg portions of the middle J-shaped flanges effects a biasing to effectively hold a sign therewithin and prevent it from being readily pulled from the elongated extrusion support member.

In the case of an elongated connector rod for supporting a sign therebeneath, that elongated rod would have an enlarged connector head at its uppermost end. The enlarged connector head would be slidable from an (open) end of the elongated central chamber or channel and slid into a desired location within that elongated central chamber. The enlarged head would not be able to fit between the gap between the lowermost feet of the lower first and the lower second J-shaped flanges. Thus such an elongated connector rod may support at its lower end, a sign or display therefrom.

An arrangement of magnets having a foot portion of an inverted "T"-shape in cross section would be slideable within the elongated upper channel between the first and second upper L-shaped flanges. Such a magnet arrangement would have a neck portion leading to the magnet pad itself for subsequent attachment to an inverted T-shaped rail in a ceiling support. These high power, discrete, position-manipulable, magnets have a strong grip with the inverted "T" rails or other receptive magnetic material, so that the holder is easily placed in the desired position. The sign support may be placed parallel, diagonally or orthogonally with respect to a T rail or a grid of T rails.

Thus what has been shown is a unique extrusion arrangement for permitting the attachment of a sign or a sign supporting rod therewithin in a convenient and readily adaptable manner.

The invention thus comprises an elongated sign holding extrusion for supporting a sign from an overhead member, comprising an elongated unitarily extruded frame assembly having an upper edge and a lower edge, with a first side portion and a second side portion extending therebetween, an elongated upper receiving-channel arranged at the upper edge of the frame assembly, an empty or hollow elongated, upper channel arranged in a spaced apart, adjacent and parallel manner to the elongated upper receiving channel in the frame assembly, an elongated central channel adjacent the second edge of the frame assembly, and an elongated middle channel containing biasing members therein for pinchably supporting a poster therebetween. The upper edge may be defined by a pair of opposed "L" shaped flanges with an elongated channel forming gap arranged therebetween. The middle channel may be defined by a middle bridge member arranged transversely between the side portions. The middle channel may have a inverted "U" shape guide channel therein. The middle channel may be defined by a "J" shaped flange extending inwardly off of each side portion of the frame assembly. Each of the "J" shaped flanges may have a distal foot thereon, which define an elongated poster guiding gap therebetween. Each of the biasing members may comprise an elongated flexible extrusion. The elongated flexible extrusion is preferably generally round in cross-section. The lower edge of the frame assembly is preferably defined by a pair of lower, "J" shaped flanges, also enclosing the elongated central chamber. The "J" shaped flanges may have a distal foot thereon and define an elongated receiving gap therebetween. An elongated sign supporting rod may be slidably receivable in the elongated central chamber, the supporting rod having an enlarged head for capture within the central chamber. The middle chamber and the central chamber may have correspondingly disposed "J" shaped flanges defining corresponding lower sides thereof.

The invention also includes a method of supporting a sign from an overhead support comprising one or more of the following steps: extruding an elongated frame assembly to define an upper edge channel, a middle chamber and a lower central channel, the middle chamber and the lower central chamber having a poster receiving gap in alignment with one another, placing a pair of free rolling biasing members in the middle chamber, sliding a poster through the gaps in the lower central chamber and into the middle chamber between the biasing members, and securing the frame assembly to an overhead support, pinching the poster between the biasing members, sloping a pair of "J" shaped flanges defining a pair of lower wall portions of the middle chamber to cause the biasing members to wedgingly press towards one another in the middle chamber, butting an upper edge of the sign into a "U" shaped guide channel in a bridging member defining a portion of the middle chamber.

The invention also comprises a method of supporting a sign from an overhead support comprising one or more of the following steps: extruding an elongated frame assembly to define an upper edge channel, a middle chamber and a lower channel, the middle chamber and the lower central chamber having a poster receiving gap in alignment with one another; sliding a support hanger in the lower central chamber, the support hanger having an enlarged head for adjustable slidable capture within the lower central chamber; attaching a sign to a lower end of the support hanger; and attaching the frame assembly to an overhead support member. The support hanger may comprise an elongated rod with a sign receiving clip on a lower end thereof. The support hanger may comprise an elongated flexible cable. The support hanger may comprise any other sign attachment means.

The invention also comprises a method of supporting a sign from an overhead support comprising one or more of the following steps: extruding an elongated frame assembly to define an upper edge channel, a middle chamber and a lower central channel, the middle chamber and the lower central chamber having a poster receiving gap in alignment with one another; placing a pair of free rolling biasing members in the middle chamber; sliding a poster through the gaps in the lower central chamber and into the middle chamber between the biasing members; sliding one or more support magnets into the upper edge channel; and securing the frame assembly magnetically to the overhead support. The overhead support may be comprised of at least one magnetically receptive ceiling support. When at least two magnetically receptive ceiling supports are utilized, the elongated frame assembly may be placed diagonally with respect to said ceiling supports.

The invention also comprises a method of supporting a sign from an overhead support, comprising one or more of the following steps of: forming an elongated housing extrusion having an open upper channel and an open lower channel; forming the extrusion with an elongated gripping-member-receiving, middle channel; inserting at least one outwardly projecting magnet in the upper channel; inserting at least two elongated, free-rolling gripping members in the, elongated middle channel; inserting a sign through the lower open channel and into a gripped relationship between the free rolling gripping members in the middle channel; attaching the elongated housing with the sign installed therein, onto the overhead support by magnetic attraction between the at least one magnet and the overhead support; pinching the sign member between the gripping members in the middle channel; attaching the housing extrusion to a first overhead support and to a separate second overhead support. The sign member may comprise at least two planar signs placed back to back for combined support within the extrusion housing.

DESCRIPTION OF THE DRAWINGS

The objects and advantages of the present invention will become more apparent when viewed in conjunction with the following drawings in which.

DETAILED DESCRIPTION OF THE PREFERRED EMBODIMENTS

Figure 1:
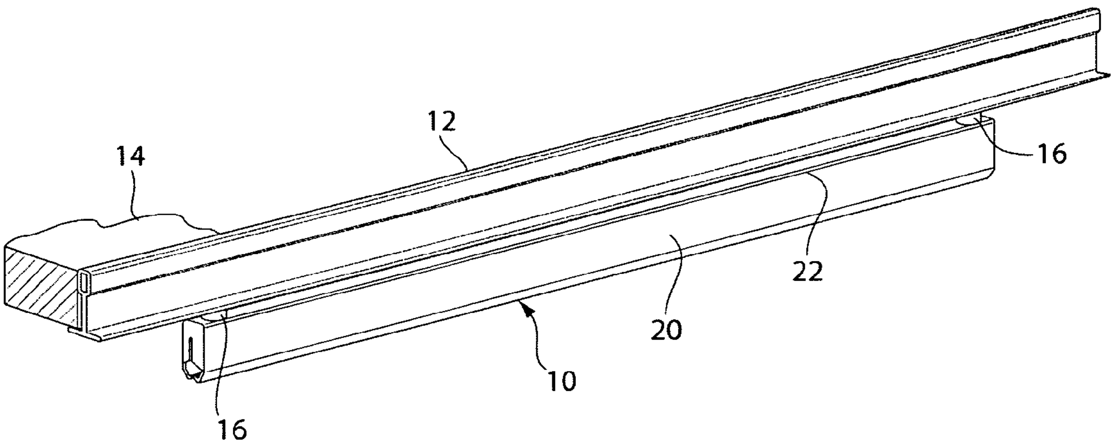
FIG. 1 is a perspective view of an elongated sign supporting extrusion assembly magnetically attached to an inverted T-rail which is part of a ceiling arrangement.
Figure 5:
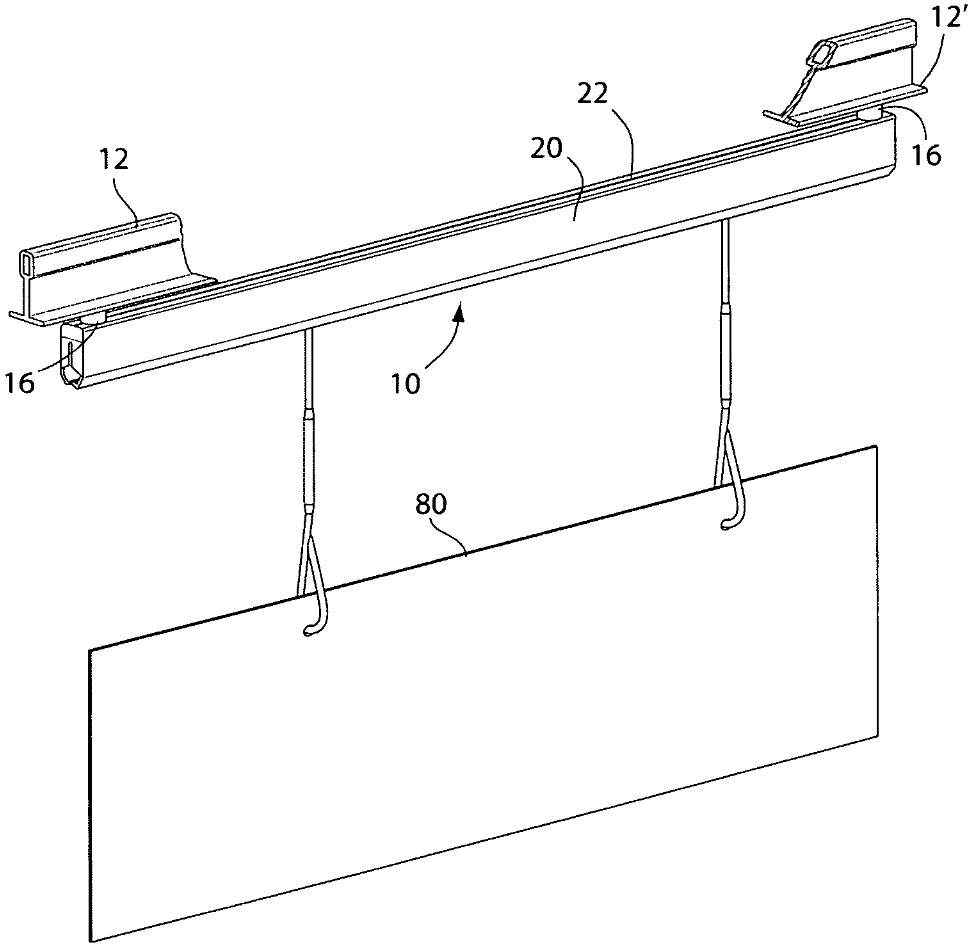
FIG. 5 is a perspective view of the elongated sign holding extrusion arrangement with the connecting elongated connecting rods represented in FIG. 3.
Figure 6:
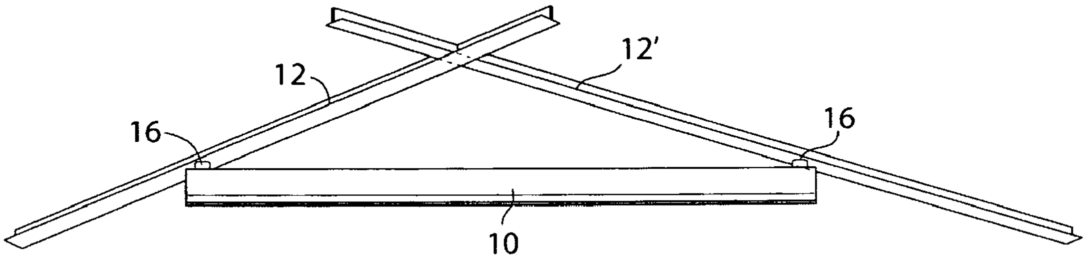
FIG. 6 is a perspective view of a sign holding extrusion supportively arranged between a pair of intersecting overhead support rails.
Figure 7:
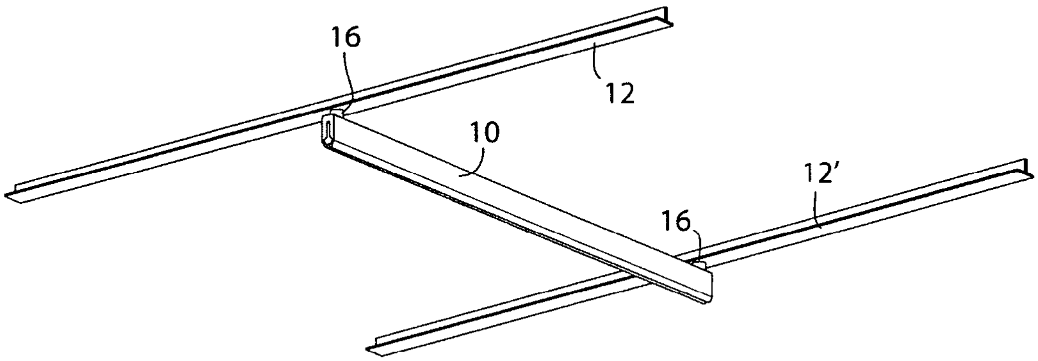
FIG. 7 is a perspective view of a sign holding extrusion supportively arranged between a pair of spaced apart, support rails.

Referring now to the drawings in detail, and particularly to FIG. 1, there is shown the present invention which comprises an elongated sign supporting extrusion 10 supportable from an inverted "T"-rail 12 which is part of a support for ceiling tiles 14. The elongated sign holding extrusion 10 is supportable to the inverted T-rail 12 by arrangement of magnets 16 disposed therebetween. The magnets 16 are sufficiently strong so as to thus likely require only one or more such magnets 16 between a T rail 12, as represented in FIGS. 1 and 5, or diagonally/orthogonally with respect to several T rails 12, as represented in FIGS. 6 and 7.

Figure 2:
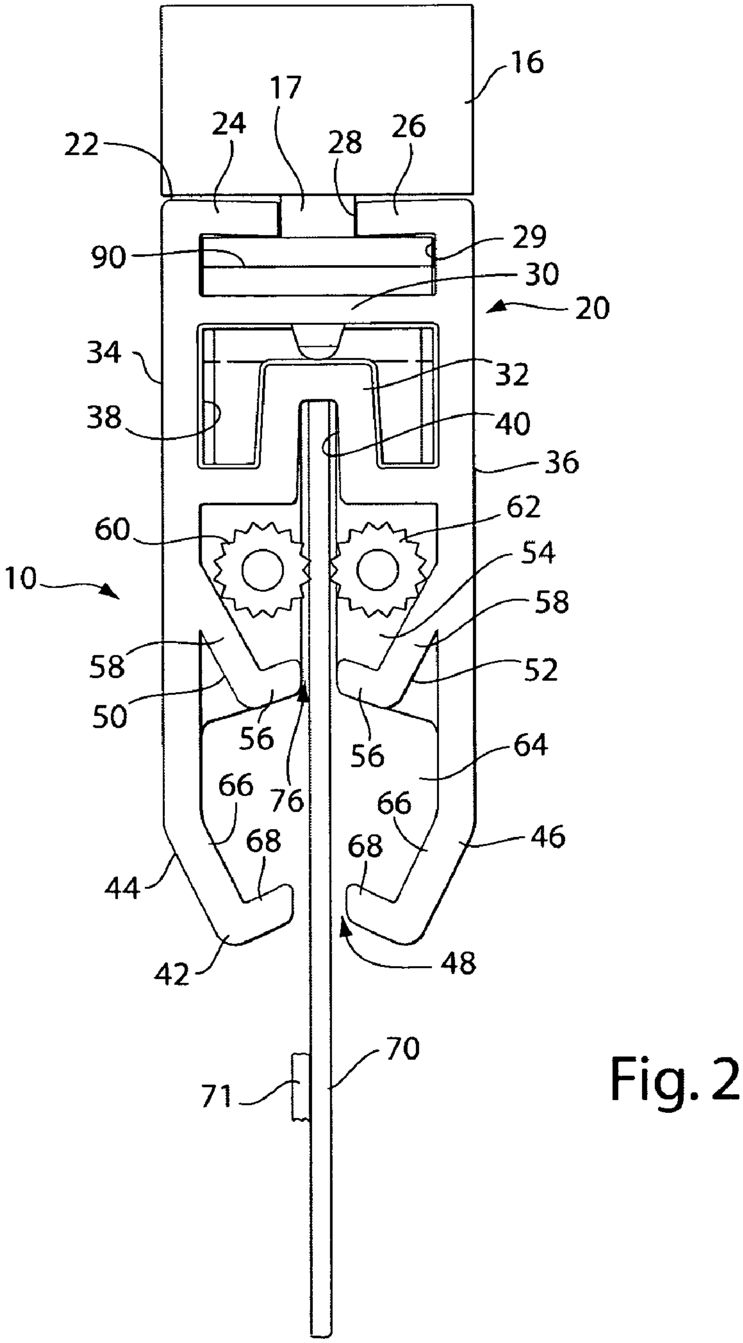
FIG. 2 is an end view of the elongated sign supporting extrusion shown in FIG. 1 at an open end thereof, showing a sign supported therewithin.

The elongated sign holding extrusion 10, as shown in FIG. 2, comprises an elongated frame assembly 20 having a first or upper edge 22 defined by a first upper "L"-shaped flange 24 and a spaced apart, parallel, second upper "L"-shaped flange 26 which between them define an elongated gap 28 and channel 29, through which a magnet arrangement 16 may be slidably disposed. The first upper L-shaped flange 24 and the second upper L-shaped flange 26 are connected to one another by an upper bridge portion 30 arranged transversely therebetween.

A middle bridge member 32 connects a first side portion 34 and a second side portion 36 of the frame assembly 20. An elongated empty upper chamber or channel 38 is disposed between the middle bridge member 32 and the elongated upper bridge member 30, as show in FIGS. 2 and 3. The middle bridge member 32 is of generally inverted "U"-shape in cross-section, defining a poster guide channel 40 therewithin.

The side portions 34 and 36 of the frame assembly 20 each extend down to a lower or second elongated edge 42 which is defined by a first lower "J"-shaped flange 44 and a lower second "J"-shaped flange 46, which between them define an elongated receiving-gap 48. The side portions 34 and 36 of the frame assembly 20 each have a middle "J"-shaped flange 50 and 52 extending inwardly therefrom to define an elongated middle chamber 54 therebetween. Each middle J-shaped flange 50 and 52 has a distal foot portion 56 and an elongated inclined surface leg portion 58 unitarily attached to the respective side portions 34 and 36 of the frame assembly 20.

A first and a second elongated, free rolling, gripping member 60 and 62 are commonly disposed in the elongated middle chamber 54 in abuttable contact with one another and in abuttable contact with the inclined middle chamber facing, tapered surfaces of the legs 58 of the middle J-shaped flanges 50 and 52

A lower elongated central channel or chamber 64 is defined by the lower first and lower second J-shaped flanges 44 and 46 with their inclined legs 66 and distal feet 68 extending generally towards one another at the lowermost edge 42 thereof. The distal tips of each of the feet 68 of the lower J-shaped flanges 44 and 46 have the elongated gap 48 therebetween, to permit entry of a sign 70 or signs 70 and 71, or an elongated connector rod 74, as represented in FIG. 3, for attachment itself, to a sign disposed therebeneath, as represented in FIG. 5.

Figure 4:
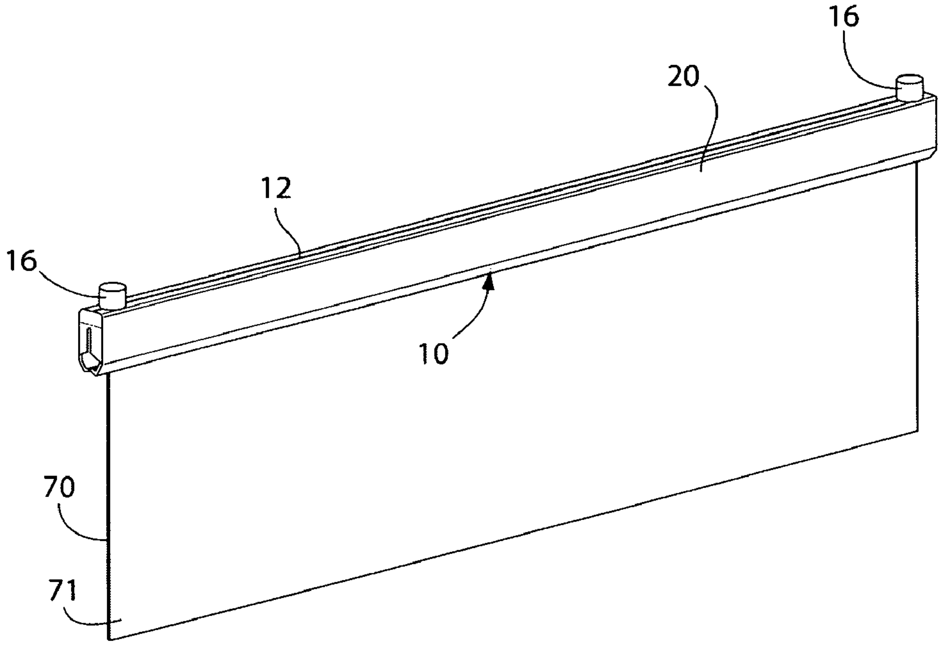
FIG. 4 is a perspective view of the elongated sign holding extrusions supporting a sign, in a manner similar to that shown in FIG. 2.

A planar sign 70 or a pair of planar signs 70 and 71, may be inserted between the lower elongated gap 48 between the lower first and the lower second J-shaped flanges 44 and 46 and also between the gap 76 situated between the middle J-shaped flanges 58 and into the middle chamber 54 between the elongated, biased, free rolling gripping members 60 and 62. The sign or signs 70 and 71 inserted therein would have an upper edge 78 which would be in abutting contact with the inverted U-shaped guide channel 40 of the middle bridge member 32. The sign 70 is shown in FIG. 4, suspended from the extrusion 10.

The first and second elongated free rolling gripping members 60 and 62 are affected by gravity, and are caused to squeeze against and pinch any sign or signs 70 and/or 71 spaced therebetween. The inclined or tapered surfaces of the respective leg portions 58 of the middle J-shaped flanges 50 and 52 effects a biasing to effectively hold a sign 70 and 71 therewithin and prevent it from being readily pulled from the elongated extrusion support member 10.

Figure 3:
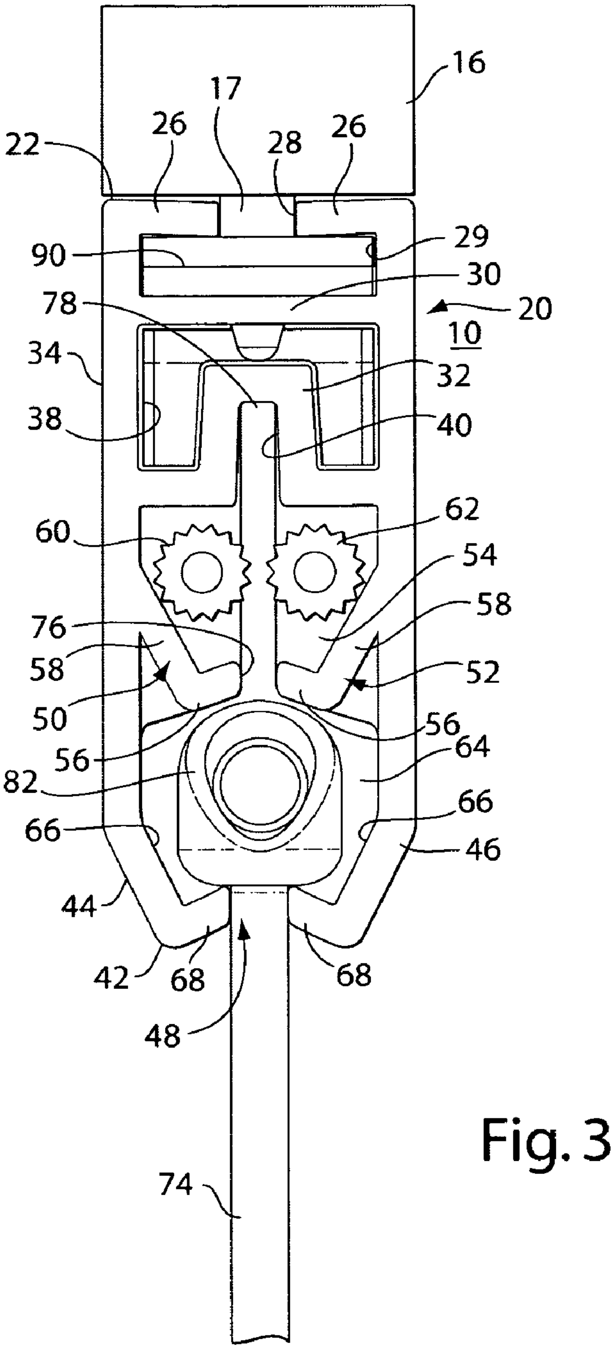
FIG. 3 is a view similar to FIG. 2 showing the elongated sign supporting extrusion with an elongated connector rod for supporting a sign therebeneath.

In the case of an elongated connector rod 74 for supporting a sign 80 therebeneath, as represented in FIG. 5, that elongated rod 74 would have an enlarged connector head 82 at its uppermost end 84, as represented in FIG. 3. The enlarged connector head 82 would be slidable from an (open) end 86 of the elongated central chamber or channel 64 and slid into a desired location within that elongated central chamber 64. The enlarged head 82 would not be able to fit between the gap 48 between the lowermost feet 68 of the lower first and the lower second J-shaped flanges 44 and 46. Thus such an elongated connector rod 74 may support at its lower end, a sign or display 80 therefrom, as shown in FIG. 5.

An arrangement of magnets 16 having a foot portion 90 of an inverted "T"-shape in cross-section, as represented in FIGS. 2 and 3 would be slideable within the elongated upper channel 29 in the gap 28 between the first and second upper L-shaped flanges 24 and 26. Such a magnet arrangement 16 would have a neck portion 17 leading to the magnet pad itself for subsequent attachment to an inverted T-shaped rail 12 which comprises the ceiling support. Such magnets 16, being spaced longitudinally within their channel 29 permits the elongated sign holding extrusion 10 to be attached parallel to a single T rail 12, as best represented in FIG. 1, or attached diagonally or orthogonally across one or more T rails 12 and 12' in an intersecting T rail ceiling support arrangement 12 and 12', as represented by T rails 12 and 12' in FIG. 6, or where those rails 12 and 12' are spaced apart as represented in FIG. 7.

Thus what has been shown is a unique extrusion arrangement for permitting the attachment of a sign or a sign supporting rod therewithin in a convenient and readily adaptable manner.

The invention claimed is:

1. An elongated sign holding extrusion for stationarily supporting a sign from an overhead member, comprising: an elongated unitarily extruded frame assembly having an upper edge and a lower edge, with a first side portion and a second side portion extending therebetween; an elongated upper receiving-channel arranged at said upper edge of said frame assembly; a hollow, elongated, upper channel arranged in a spaced apart, adjacent and parallel manner to said elongated upper receiving channel in said frame assembly; an elongated middle chamber containing a first elongated, cylindrically shaped, gravity-dependent freely-rollable, biasing member and a second elongated, cylindrically shaped, gravity-dependent freely-rollable, biasing member therein, wherein the first and the second biasing members are each independently movable toward and away from one another within the middle chamber, the first and the second biasing members being arranged to permit the independent lateral movement of the biasing members for the gravity dependent, stationary display and pinchable support of a poster sign therebetween and to also permit the subsequent manipulable changing of a poster sign disposed therebetween; and an elongated lower channel adjacent said lower edge of said frame assembly.

2. The sign holding extrusion as recited in claim 1, wherein said upper edge being defined by a pair of opposed "L" shaped flanges with an elongated channel forming gap arranged therebetween.

3. The elongated sign holding extrusion as recited in claim 1, wherein said middle channel is defined by a middle bridge member arranged transversely between said side portions.

4. The elongated sign holding extrusion as recited in claim 3, wherein said middle channel has an inverted "U" shape guide channel therein.

5. The elongated sign holding extrusion as recited in claim 3, wherein said middle channel is defined by a "J" shaped flange extending inwardly off of each side portion of said frame assembly.

6. The elongated sign holding extrusion as recited in claim 5, wherein each of said "J" shaped flanges have a distal foot thereon, which define an elongated poster guiding gap therebetween.

7. The elongated sign holding extrusion as recited in claim 5, wherein each of said biasing members comprises an elongated flexible extrusion.

8. The elongated sign holding extrusion as recited in claim 1, wherein said lower edge of said frame assembly is defined by a pair of lower, "J" shaped flanges, also enclosing said elongated lower channel.

9. The elongated sign holding extrusion as recited in claim 8, wherein said "J" shaped flanges have a distal foot thereon and define an elongated receiving gap therebetween.

10. A method of stationarily supporting a sign from an overhead support comprising:

extruding an elongated frame assembly to define an upper edge channel, a middle chamber and a lower channel, said middle chamber and said lower channel each having a poster receiving gap in alignment with one another;

placing a first gravity-dependent, cylindrically-shaped free rolling, independently movable biasing member and a second gravity-dependent, cylindrically-shaped free rolling, independently movable biasing member toward and away from one another in said middle chamber so as to permit the biasedly pinching and permit the stationary support, only by the effect of gravity, of any poster placed therebetween;

sliding a poster through said gaps in said lower channel and into said middle chamber stationarily securable between said biasing members; and securing said frame assembly to an overhead support.

11. The method as recited in claim 10, including:

sloping a pair of "J" shaped flanges defining a pair of lower wall portions of said middle chamber, to cause said biasing members to wedgingly press towards one another in said middle chamber.

12. The method as recited in claim 10, including:

butting an upper edge of said sign into a "U" shaped guide channel in a bridging member defining a portion of said middle chamber.

13. A method of stationarily supporting a sign from an overhead support comprising:

extruding an elongated frame assembly to define an upper edge channel, a middle chamber and a lower channel, said middle chamber and said lower channel having a poster receiving gap in alignment with one another;

placing a first elongated, gravity-dependent, cylindrically shaped freely-rollable, independently movable biasing member and a second elongated, gravity-dependent, cylindrically shaped freely-rollable, independently movable biasing member in said middle chamber, which members are independently movable toward and away from one another within the middle chamber, to permit independent lateral movement of the biasing members to adhesion-free, biasedly and stationarily pinch only by the effect of gravity, any poster placed between those biasing members;

sliding a support connector rod in said lower channel;

attaching a sign to a lower end of said support connector rod; and attaching said frame assembly to an overhead support member.

14. The method as recited in claim 13, wherein said support connector rod comprises an elongated rod with a sign receiving detail on a lower end thereof.

15. The method as recited in claim 13, wherein said support connector rod comprises an elongated flexible cable.

16. A method of stationarily supporting a sign from an overhead support comprising:

extruding an elongated frame assembly to define an upper edge channel, a middle chamber and a lower channel, said middle chamber and said lower channel having a poster receiving gap in alignment with one another;

placing a first elongated, cylindrically-shaped, gravity dependent, independently movable, free rolling biasing member and a second elongated, cylindrically-shaped, gravity-dependent, independently movable, free rolling biasing member, each biasing member being gravitationally induced so as to be independently movable toward from one another, and to be movable independently away from one another in said middle chamber;

sliding a poster sign through said gaps in said lower channel and into said middle chamber for its stationary support between said independently movable, gravity dependent, cylindrically-shaped biasing members;

sliding one or more support magnets into said upper edge channel; and securing said frame assembly magnetically to said overhead support.

17. The method as recited in claim 16, wherein said overhead support comprises at least one magnetically receptive ceiling support.

18. The method as recited in claim 17, wherein at least one of said magnetically receptive ceiling support is utilized to place said elongated frame assembly diagonally with respect to said ceiling supports.

19. The method as recited in claim 17, wherein at least one said magnetically receptive ceiling support is utilized to place said elongated frame assembly in a parallel arrangement with respect to said ceiling supports.

20. The method as recited in claim 18, wherein at least one of said magnets is attached to its own particular magnetically receptive ceiling support.

21. The method as recited in claim 20, wherein said magnetically receptive ceiling support is arranged to intersect with another of said magnetically receptive ceiling supports.

22. A method of stationarily supporting a sign from an overhead support, comprising: forming an elongated housing extrusion having an open upper channel and an open lower channel; forming said extrusion with an elongated gripping-member-receiving, middle chamber; inserting at least one outwardly projecting magnet in said upper channel; inserting at least two elongated, independently movable, cylindrically-shaped, gravity-dependent free-rolling gripping members in said elongated middle channel, which gripping members are gravitationally induced and movable independently toward and are also independently movable away from one another within the middle chamber; transversely inserting a sign member through said lower open channel and into a stationary, gravity-induced: gripped, sign display relationship between said cylindrically-shaped, gravity enabled, free rolling, independently movable, adhesion-free gripping members in said middle channel; and attaching said elongated housing with said sign member installed therein, onto said overhead support by magnetic attraction between said at least one magnet and said overhead support.

23. The method as recited in claim 22, including:

pinching said sign member between said gripping members in said middle channel.

24. The method as recited in claim 23, wherein said sign member comprises at least two planar signs placed back to back for combined support within said extrusion housing.

25. The method as recited in claim 22, including:

attaching said housing extrusion to a first overhead support and to a separate second overhead support.

* * * * *